Nov. 6, 1956 W. E. PEERY 2,769,922
TAPE READING MECHANISM
Filed Feb. 6, 1952
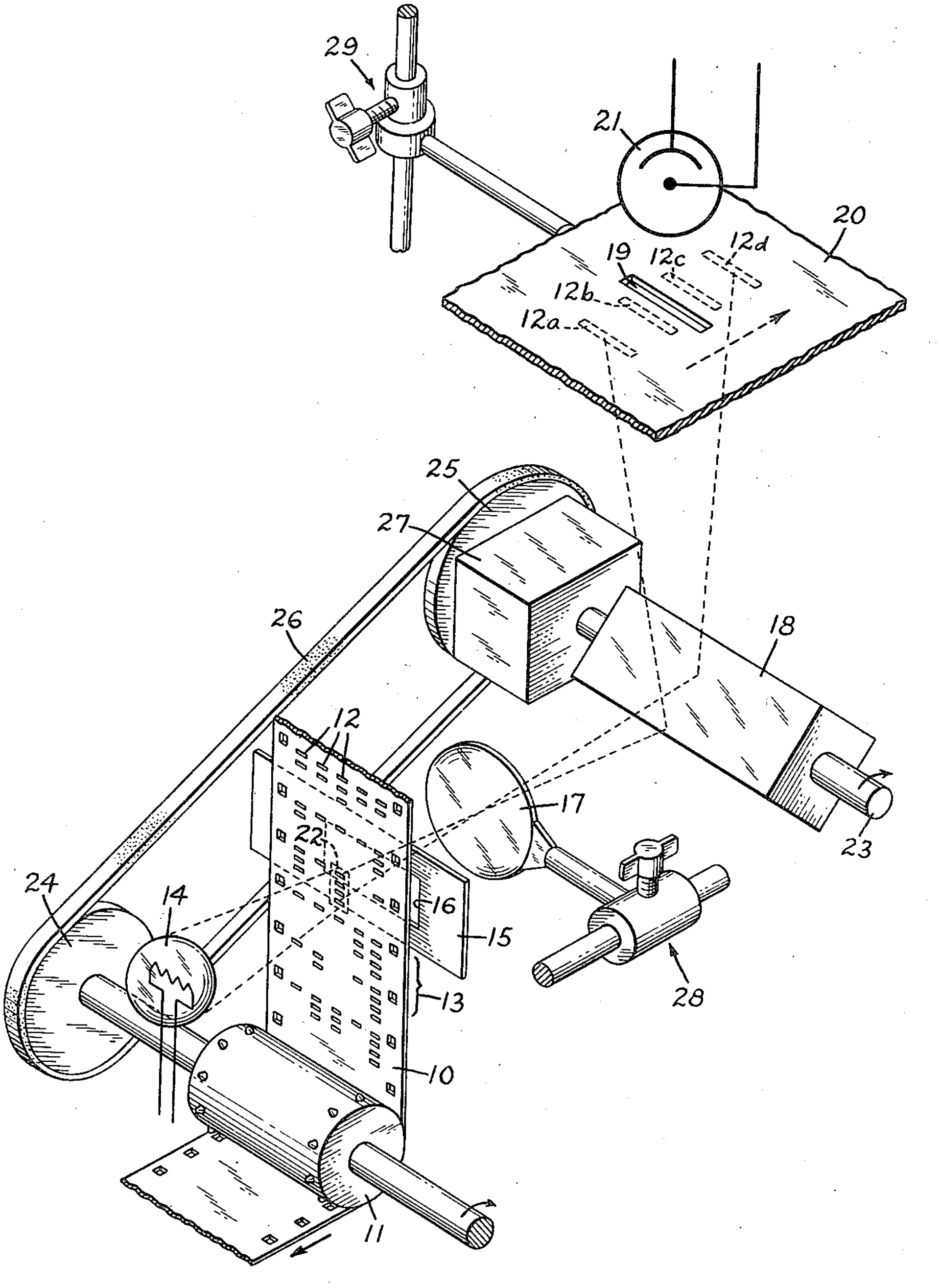
INVENTOR.
WALTER E. PEERY
BY
Campbell, Brumbaugh, Free & Graves
HIS ATTORNEYS.

United States Patent Office 2,769,922

Patented Nov. 6, 1956

2,769,922

TAPE READING MECHANISM

Walter E. Peery, Pottersville, N. J., assignor to Time, Incorporated, New York, N. Y., a corporation of New York Application February 6, 1952, Serial No. 270,214

9 Claims. (Cl. 250—219)

The present invention relates to devices for reading intelligence in the form of code elements or the like, carried by a control member such as a card or tape, for example. More particularly, it has to do with novel and highly effective reading mechanism for converting such intelligence to signals capable of controlling apparatus in a desired manner.

The applicant's copending application Serial No. 41,318, filed July 29, 1948, for "Electronic Phototype-Composing System" discloses a machine which is adapted to be controlled in response to code elements on a control tape. In order to avoid complications in preparing the tape and for reasons of economy, the code elements on the control tape representing the signal modules follow each other without intervening space. The requirements of the machine necessitate the reading of the code element or elements representing each signal module during a particular part of the recurring operating cycle of the machine. Specifically, the code element or elements must be converted to signals in an initial part of the cycle of operation of the machine, which signals are adapted to control the operation of the machine in another portion of the same cycle of operation. This can be effected by imparting to the tape alternate periods of motion and dwell, the code element or elements being read in the former, and the machine acting in response to the signals thus produced during the latter. For very fast rates of operation, however, this is not entirely satisfactory because the rapid starting and stopping of the control tape imposes undesirable stresses in the tape as well as in the feed mechanism therefor.

It is an object of the invention, accordingly, to provide new and improved mechanism for reading code elements on a control tape or like, of the type wherein the successive groups of code elements representing the signal modules follow each other without intervening space, which is free from the above-noted deficiencies of the prior art.

Another object of the invention is to provide new and improved reading mechanism of the above character in which the control tape is advanced at substantially constant velocity while the signals produced have essentially the same characteristics as those generated when alternate periods motion and dwell are imparted to the tape.

A further object of the invention is to provide new and improved reading mechanism of the above character in which the portion of the operating cycle devoted to reading the code element or elements corresponding to a signal module may be adjusted over a relatively wide range.

According to the invention, an optical image is made of the intelligence constituting each signal module on the control member while the control member is advanced at substantially constant velocity and this image is directed to photoelectric means. Interposed between the image forming means and the photoelectric means is reflector means to which rotational movement is adapted to be imparted in timed relation to the advancement of the control member. The reflector means in its motion causes the image of the intelligence on the control member to sweep past the photoelectric means, thereby generating electric signals having characteristics like those which would be generated if the control member were advanced with alternate periods of motion and dwell.

By changing the number of faces on the reflector means and simultaneously altering the rotational speed of the reflector means relatively to the rate of advancement of the control member as a function of the number of reflecting faces, the rate of sweep of the image past the photoelectric means can be adjusted over a relatively wide range. Further adjustment can be effected by altering the size of the image in the known manner, or by changing the position of an apertured diaphragm disposed between the photoelectric means and the reflector means. In this fashion, the proportions of the cycle devoted to reading of the intelligence on the control member constituting a signal module and to dwell can be varied over a relatively wide range.

For a better understanding of the invention, reference is made to the accompanying detailed description of a representative embodiment which is shown in the single figure on the accompanying drawing.

Referring to the drawing, the control member may comprise, for example, a control tape 10 which may be advanced at substantially constant velocity by suitable means such as a sprocket wheel 11 driven by suitable motive means (not shown). The tape 10 carries control intelligence thereon which may be in the form of indicia 12 having markedly different light transmitting properties from the tape 10 so as to facilitate the formation of an optical image thereof as will be described in detail later. Preferably, the indicia 12 comprise perforations formed in the tape 10 which may be opaque.

The tape 10 is so prepared that the one or more indicia 12 corresponding to a signal module occupy a unit length of the tape 10 which is designated in the figure by the reference character 13. In the typical example shown in the figure, five separate vertical columns of indicia 12 are shown corresponding to five different kinds of information to be used in controlling a particular machine. For simplicity, however, apparatus for reading only one of the columns of indicia 12 is shown in the drawings and described herein, since identical apparatus would be employed for reading the other four columns.

An image of one or more indicia 12 lying in a unit length of the tape 10 corresponding to one signal module is formed by suitable optical projection means, such as, for example, a light source 14, diaphragm means 15 having a substantially rectangular aperture 16 formed therein and a lens system 17. The aperture 16 defines a scanning zone in which each of the signal modules is successively framed as a result of the continuous lengthwise motion of the tape 10. Disposed in the path to the image thus formed is a multisided reflector 18 which is adapted to cause the image to sweep across an aperture 19 formed in a diaphragm 20 in front of conventional photoelectric means 21, thereby generating a plurality of electrical pulses equal in number to the number of indicia in the signal module. For example, with the tape 10 in the position shown, images 12*a*, 12*b*, 12*c* and 12*d* of the four indicia 12 comprising the group 22 on the tape 10 are being swept past the aperture 19.

The multisided reflector 18 is mounted on a shaft 23 on which it is adapted to be rotated in timed relation to the advancement of the control tape 10. To this end, it may be driven directly from the shaft of the sprocket wheel 11 through the pulleys 24 and 25 and the belt 26, a conventional adjustable, forward and reverse speed control mechanism 27 being interposed between the pulley 25 and the shaft 23. For proper operation, the rotational speed of the multisided reflector 18 should be such that it makes one complete revolution in the time required for $n$ complete signal modules to pass the aperture 16 in the diaphragm 15, where $n$ is the number of sides possessed by the mirror 18.

In operation, the tape 10 is advanced at a substantially constant velocity such that one signal module 13 traverses the aperture 16 in the diaphragm 15 for each operating cycle of the machine to be controlled. For the four sided reflector 18 shown in the figure, the speed control mechanism 27 should be adjusted so that the shaft 23 makes one complete revolution during the time that four successive signal modules on the tape 10 pass the aperture 16. Further, the rotation of the reflector 18 should be properly phased with respect to the progress of each signal module across the aperture 16 so as to project an image of the signal module properly on the diaphragm 20.

The rate at which the images of the indicia 12 are swept past the aperture 19 can be reduced, according to the invention, by using a multisided reflector 18 having a greater number of sides, for which a lower rotational speed will have to be imparted to the shaft 23 in accordance with the relation given above. On the other hand, the rate at which the images of the indicia 12 are swept past the aperture 19 can be increased by using a multisided reflector 18 having a smaller number of sides, for which the speed of rotation of the shaft 23 will have to be increased proportionally. By using multisided reflectors 18 having different numbers of sides and adjusting the rotational speed of the shaft 23 accordingly by adjustment of the speed control mechanism 27, it will be understood that the portion of the machine operating cycle devoted to reading of the tape 10 can be varied over a considerable range.

If the shaft 23 rotates in the same direction as the sprocket 11, the velocity of movement of the indicia 12 past the aperture 16 will be added to the velocity of rotation of the shaft 23. On the other hand, if the shaft 23 rotates in the direction opposite to the direction of rotation of the sprocket 11, the speed of passage of the indicia 12 past the aperture 16 will be subtracted from the rotation of the shaft 23. Hence, it will be apparent that the rate at which the images of the indicia 12 are swept past the aperture 19 in front of the photoelectric cell 21 can be further adjusted by controlling the direction of rotation of the shaft 23 with respect to the sprocket 11. Hence, the speed control mechanism 27 should be of such construction that rotation in either the forward or the reverse direction can be had.

Further adjustment of the rate at which the images of the indicia 12 are swept past the aperture 19 may be effected by modifying the sizes of the images projected on the diaphragm 20. To this end, the lens system 17 may be provided with an adjustable mounting 28 and the diaphragm 20 and photocell 21 may also be provided with an adjustable mounting 29 whereby some adjustment of the size of the image may be obtained. Further, different kinds of lenses may be employed in the lens system 17 as required to enable the size of the image to be varied. Moreover, for any given size of image, the time required for a signal module to traverse the aperture 19 will be inversely proportional to the distance from the reflector 18 to the diaphragm 20 so that adjustment of the latter distance affords another way of changing the proportions of the reading and dwell cycles.

The invention thus provides novel and highly effective mechanism for reading intelligence on a control member such as a control tape, for example. By utilizing rotating multisided reflector means to cause an image of the intelligence on the control member to sweep past a photoelectric device, the control member may be advanced at substantially constant speed, while the signals produced by the photoelectric cell will have essentially the same characteristics as if the control member were being advanced with alternate periods of motion and dwell. Moreover, by changing the number of sides in the reflector and adjusting its speed of rotation relatively to the rate of advancement of the control member, the portion of the cycle of operation devoted to reading of the intelligence on the control member may be adjusted over a wide range. Further adjustment of the duration of the reading portion of the cycle may be effected by providing for adjustment of the size of the image in the manner described, or of the location of an apertured diaphragm disposed between the reflector and the photosensitive device.

The single embodiment shown in the drawings and described herein is obviously susceptible of considerable modification in form and detail within the spirit of the invention. That embodiment, therefore, is to be regarded as illustrative only and not as limiting the scope of the following claims.

I claim:

1. Mechanism for converting into a time sequence of electric signals the intelligence distributed over the length of each signal module in a plurality of modules disposed along a control member, said mechanism comprising, feed means for advancing said control member to pass said modules lengthwise through a scanning zone, photoelectric means, rotatable light deflecting means disposed in an optical path between said zone and photoelectric means and adapted upon rotation to scan along the line of travel of said modules, drive means for rotating said deflecting means at a speed and phase which synchronize the appearance of each module in said zone with deflection of the light therefrom by said deflecting means towards said photoelectric means, first optical means for forming from said last-named module an image having with respect to said optical path an optical relation productive of a sweep of the length of said image past said photoelectric means during said synchronous rotation, and second optical means for limiting the subject seen by said photoelectric means at any instant of said sweep to an image portion having a fraction of the length of the whole swept image.

2. Mechanism for converting into a time sequence of electric signals the intelligence distributed over the length of each signal module in a plurality of modules disposed along a control member, said mechanism comprising, feed means for advancing said control member to pass said modules lengthwise through a scanning zone, photoelectric means, rotatable light deflecting means disposed in an optical path between said zone and photoelectric means and adapted upon rotation to scan along the line of travel of said modules, drive means for rotating said deflecting means at a speed and phase which synchronize the appearance of each module in said zone with deflection of the light therefrom by said deflecting means towards said photoelectric means, speed control means for shifting the rotation rate of said deflecting means from one synchronous speed to another, first optical means for forming from said last-named module an image having with respect to said optical path an optical relation productive of a sweep of the length of said image past said photoelectric means during said synchronous rotation, and second optical means for limiting the subject seen by said photoelectric means at any instant of said sweep to an image portion having a fraction of the length of the whole swept image.

3. Mechanism for converting into a time sequence of electric signals the intelligence distributed over the length of each signal module in a plurality of modules disposed along a control member, said mechanism comprising, feed means for advancing said control member to pass said modules lengthwise through a scanning zone, photoelectric means, rotatable light deflecting means disposed in an optical path between said zone and photoelectric means and adapted upon rotation to scan along the line of travel of said modules, drive means for rotating said deflecting means at a speed and phase which synchronize the appearance of each module in said zone with deflection of the light therefrom by said deflecting means towards said photoelectric means, first optical means for forming from said last-named module an image having with respect to said optical path an optical relation productive of a sweep of the length of said image past said photoelectric means during said synchronous rotation, means rendering adjustable the size of said swept image, and second optical means for limiting the subject seen by said photoelectric means at any instant of said sweep to an image portion having a fraction of the length of the whole swept image.

4. Mechanism for converting into a time sequence of electric signals the intelligence distributed over the length of each signal module in a plurality of modules disposed along a control member, said mechanism comprising, feed means for advancing said control member to pass said modules lengthwise through a scanning zone, photoelectric means, rotatable light deflecting means disposed in an optical path between said zone and photoelectric means and adapted upon rotation to scan along the line of travel of said modules, drive means for rotating said deflecting means at a speed and phase which synchronize the appearance of each module in said zone with deflection of the light therefrom by said deflecting means towards said photoelectric means, speed control means for shifting the rotation rate of said deflecting means from one synchronous speed to another, first optical means for forming from said last-named module an image having with respect to said optical path an optical relation productive of a sweep of the length of said image past said photoelectric means during said synchronous rotation, means rendering adjustable the size of said swept image, and second optical means for limiting the subject seen by said photoelectric means at any instant of said sweep to an image portion having a fraction of the length of the whole swept image.

5. Mechanism for converting into a time sequence of electric signals the intelligence distributed over the length of each signal module in a plurality of modules disposed along a control member, said mechanism comprising, feed means for advancing said control member to pass said modules lengthwise through a scanning zone, photoelectric means, rotatable light deflecting means disposed in an optical path between said zone and photoelectric means and adapted upon rotation to scan along the line of travel of said modules, drive means for rotating said deflecting means at a speed and phase which synchronize the appearance of each module in said zone with deflection of the light therefrom by said deflecting means towards said photoelectric means, control means for selectively reversing the direction of synchronous rotation of said deflecting means, first optical means for forming from said last-named module an image having with respect to said optical path an optical relation productive of a sweep of the length of said image past said photoelectric means during said synchronous rotation, and second optical means for limiting the subject seen by said photoelectric means at any instant of said sweep to an image portion having a fraction of the length of the whole swept image.

6. Mechanism for converting into a time sequence of electric signals the intelligence respectively carried by separate visual indicia distributed over the length of each signal module in a plurality of modules disposed along a control member and including apiece at least one indicium, said mechanism comprising, feed means for advancing said control member to pass said modules lengthwise through a scanning zone, photoelectric means, rotatable light deflecting means disposed in an optical path between said zone and photoelectric means and adapted upon rotation to scan along the line of travel of said modules, drive means for rotating said deflecting means at a speed and phase which synchronize the appearance of each module in said zone with deflection of the light therefrom by said deflecting means towards said photoelectric means, first optical means for forming from said last-named module an image having with respect to said optical path an optical relation productive of a sweep of the length of said image past said photoelectric means during said synchronous rotation, and second optical means for limiting the subject seen by said photoelectric means at any instant of said sweep to the image of no more than one indicium included within the module providing the whole swept image.

7. Mechanism for converting into a time sequence of electric signals the intelligence distributed over the length of each signal module in a plurality of modules disposed along a control member, said mechanism comprising, feed means for advancing said control member to pass said modules lengthwise through a zone representing the point of origin for images of modules therein, photoelectric means, rotatable light deflecting means disposed in an optical path between said zone and photoelectric means and adapted upon rotation to scan along the line of travel of said modules, drive means for rotating said deflecting means at a speed and phase which synchronize the appearance of each module in said zone with deflection of the image thereof by said deflecting means towards said photoelectric means and in a direction productive of a sweep of the length of said image past said photoelectric means during said synchronous rotation, and optical means for limiting the subject seen by said photoelectric means at any instant of said sweep to an image portion having a fraction of the length of the whole swept image.

8. Mechanism as in claim 7 further characterized by speed control means for shifting the rotation rate of said deflection means from one synchronous speed to another.

9. Mechanism as in claim 7 further characterized by means rendering adjustable the size of the image swept past said photoelectric means.

References Cited in the file of this patent

UNITED STATES PATENTS

| | | |
|---|---|---|
| 1,910,995 | Leventhal | May 23, 1933 |
| 2,143,214 | Selenyi | Jan. 10, 1939 |
| 2,486,334 | Slamar | Oct. 25, 1949 |
| 2,580,270 | Badglley et al. | Dec. 25, 1951 |
| 2,594,358 | Shaw | Apr. 29, 1952 |